US010442943B2

(12) United States Patent
Insulaire et al.

(10) Patent No.: US 10,442,943 B2
(45) Date of Patent: Oct. 15, 2019

(54) INK COMPOSITION FOR INKJET PRINTING BY THE CONTINUOUS DEFLECTED INK JET TECHNIQUE NOTABLY FOR SAFETY MARKINGS

(71) Applicant: MARKEM IMAJE HOLDING, Bourg les Valence (FR)

(72) Inventors: Mickaelle Insulaire, Valence (FR); Gregory Guillot-Patrique, Vinay (FR)

(73) Assignee: MARKEM-IMAJE HOLDING, Bourg-les-Valence (FR)

( * ) Notice: Subject to any disclaimer, the term of this patent is extended or adjusted under 35 U.S.C. 154(b) by 191 days.

(21) Appl. No.: 14/750,155

(22) Filed: Jun. 25, 2015

(65) Prior Publication Data

US 2015/0376430 A1    Dec. 31, 2015

(30) Foreign Application Priority Data

Jun. 26, 2014  (FR) ...................................... 14 55990

(51) Int. Cl.
| | |
|---|---|
| C09D 11/328 | (2014.01) |
| C08J 7/04 | (2006.01) |
| C09D 11/38 | (2014.01) |
| C09D 11/033 | (2014.01) |
| C09D 11/52 | (2014.01) |
| C09D 11/14 | (2006.01) |
| C09D 11/32 | (2014.01) |
| C09D 11/36 | (2014.01) |

(52) U.S. Cl.
CPC ............ *C09D 11/328* (2013.01); *C08J 7/047* (2013.01); *C09D 11/14* (2013.01); *C09D 11/32* (2013.01); *C09D 11/36* (2013.01); *C09D 11/38* (2013.01); *C09D 11/52* (2013.01); *C08J 2323/06* (2013.01); *C08J 2401/14* (2013.01); *C08J 2475/04* (2013.01)

(58) Field of Classification Search
CPC .................................................... C09D 11/30
See application file for complete search history.

(56) References Cited

U.S. PATENT DOCUMENTS

| | | | |
|---|---|---|---|
| 4,024,096 A | 5/1977 | Wachtel | |
| 4,153,593 A | 5/1979 | Zabiak et al. | |
| 4,155,767 A | 5/1979 | Specht et al. | |
| 4,166,044 A | 8/1979 | Germonprez et al. | |
| 4,260,531 A | 4/1981 | Wachtel et al. | |
| 4,465,800 A | 8/1984 | Bhatia | |
| 4,567,213 A | 1/1986 | Bhatia et al. | |
| 4,756,758 A | 7/1988 | Lent et al. | |
| 4,834,799 A | 5/1989 | Song | |
| 4,880,465 A | 11/1989 | Loria et al. | |
| 5,102,458 A | 4/1992 | Lent et al. | |
| 5,316,575 A | 5/1994 | Lent et al. | |
| 5,395,431 A | 3/1995 | Siddiqui et al. | |
| 5,395,432 A | 3/1995 | Nelson et al. | |
| 5,594,044 A | 1/1997 | Yang | |
| 5,637,139 A | 6/1997 | Morelos et al. | |
| 7,520,926 B2 | 4/2009 | Zhu et al. | |
| 9,695,303 B2* | 7/2017 | Schafer | B60C 1/00 |
| 2005/0113481 A1* | 5/2005 | Sabys | C09D 11/36 523/160 |
| 2007/0263018 A1* | 11/2007 | Vanini | C09D 11/36 347/1 |
| 2013/0044168 A1* | 2/2013 | Kaga | B41M 5/0023 347/102 |
| 2014/0378585 A1 | 12/2014 | Ng et al. | |

FOREIGN PATENT DOCUMENTS

| | | |
|---|---|---|
| CN | 1629228 A | 6/2005 |
| CN | 1788057 A | 6/2006 |
| CN | 101541893 A | 9/2009 |
| CN | 103403105 A | 11/2013 |
| CN | 103827233 A | 5/2014 |
| CN | 104231746 A | 12/2014 |
| EP | 0 034 881 A1 | 2/1981 |
| EP | 0 289 141 A2 | 11/1988 |
| EP | 0 510 752 B1 | 10/1992 |
| EP | 0 735 120 A2 | 10/1996 |
| EP | 0 924 335 B1 | 3/2007 |
| FR | 2 460 982 A1 | 1/1981 |
| FR | 2 796 959 A1 | 2/2001 |
| GB | 2 277 044 A | 10/1994 |
| GB | 2 286 402 A | 8/1995 |
| GB | 2 298 713 A | 9/1996 |
| JP | 3237794 B2 | 12/2001 |
| WO | 92/14794 | 9/1992 |
| WO | 92/14795 | 9/1992 |
| WO | 95/29287 | 11/1995 |
| WO | 96/23844 | 8/1996 |
| WO | 2004-081125 A1 | 9/2004 |
| WO | 2006/095702 | 9/2006 |
| WO | 2006-097502 A1 | 9/2006 |
| WO | 2008/031765 A1 | 3/2008 |
| WO | 2012/120088 A2 | 9/2012 |

OTHER PUBLICATIONS

French Search Report dated Feb. 11, 2015 for related French Application No. 1455990.

(Continued)

*Primary Examiner* — Scott R. Walshon
*Assistant Examiner* — Sathavaram I Reddy
(74) *Attorney, Agent, or Firm* — Miles & Stockbridge, P.C.

(57) ABSTRACT

An ink composition for printing by the continuous deflected ink jet technique, liquid at room temperature, including a method for marking or printing on a substrate, support or object using said ink composition, and a substrate, support, or object provided with a marking obtained by drying, and/or absorption of said ink composition, in which the ink composition includes a solvent including one or several organic solvent compounds, and optionally water; a binder comprising at least one binding resin; at least one plasticizer of said binding resin; at least one dye which belongs to the family of anthraquinone dyes; and optionally, at least one or several other dyes and/or pigments which do not belong to the family of anthraquinone dyes.

31 Claims, No Drawings

(56) References Cited

OTHER PUBLICATIONS

Chinese Office Action dated Mar. 26, 2019 for Application No. 201510369489.4.
Chinese Search Report dated Mar. 21, 2019 for Application No. 201510369489.

\* cited by examiner

INK COMPOSITION FOR INKJET PRINTING BY THE CONTINUOUS DEFLECTED INK JET TECHNIQUE NOTABLY FOR SAFETY MARKINGS

TECHNICAL FIELD

The invention relates to an ink composition for which the properties are particularly well adapted to the marking or to the printing with a liquid jet, and most particularly to the marking by a deviated, deflected continuous ink jet.

The ink composition according to the invention may be used for marking of substrates, supports and objects of all kinds.

The ink composition according to the invention is notably suitable for marking substrates, supports, and objects in organic polymers, in particular in thermoplastic polymers («plastic materials»), such as polyolefins like polyethylenes (PE) or polypropylenes (PP), or further poly(ethylene terephthalate) (PET). The ink composition according to the invention is particularly suitable for marking bottles, flasks or stoppers in organic polymers, notably in polyolefins, such as polyethylenes or polypropylenes.

The ink composition according to the invention gives the possibility of obtaining markings which may be described as safety markings, i.e. markings which remain permanent even after attempts at erasing these markings, for example for fraudulent purposes, by dissolution with a solvent. In other words, the ink composition according to the invention gives the possibility of obtaining un-erasable markings.

STATE OF THE PRIOR ART

Ink jet printing is a well known technique which allows printing, marking, or decoration of any kinds of objects, at a great rate, and without contact of these objects with the printing device, with variable messages at will, such as bar codes, sell-by dates, etc. and this even on non-planar supports.

Inkjet printing techniques are divided in two great kinds, i.e.: the so-called «drop on demand» technique (or DOD), and the so-called «continuous ink jet» technique (or CIJ).

We shall be more particularly interested in this latter technique, more specifically the continuous deviated, deflected ink jet technique.

The projection by deviated continuous jet consists of sending under pressure, ink into a cavity containing a piezo-electric crystal, from where the ink escapes through an orifice (nozzle) as a jet.

The piezo-electric crystal, vibrating at a determined frequency, causes pressure perturbations in the ink jet, which oscillates and gradually breaks into spherical drops or droplets. An electrode, placed on the trajectory of the jet, where it breaks, gives the possibility of giving these drops an electrostatic charge, if the ink is conductive. The thereby charged drops are deflected in an electric field and allow printing. The non-charged drops, therefore not deflected, are recovered in a gutter where the ink is sucked up and then recycled towards the ink circuit.

This type of ink projection by jet ensures contactless marking at a great running speed on objects not necessarily planar and with the possibility of changing the message at will.

The technique is particularly adapted to the marking and to the identification (expiration dates, series numbers, batch numbers, bar code numbers, etc.) of industrial products on production lines.

The ink compositions, capable of being projected, printed, by the deviated continuous jet technique, have to satisfy a certain number of criteria inherent to this technique, relating inter alia to the viscosity, electric conductivity, the solubility in a solvent for the cleaning, the compatibility of the ingredients, the proper wetting of the supports to be marked, etc.

Particular and important criteria which the ink compositions have to satisfy for printing by the deviated continuous jet technique, stem from the fact on the one hand that ink consumption is low when the number of printed characters per message is small, and from the fact on the other hand that the jet is continuous and that the ink re-circulates several times before being projected. Consequently, the ink is in contact with ambient air upon sucking up non-deflected drops, and it may be led to absorption of ambient humidity or reaction with oxygen of the air, and it may thus be modified.

In spite of this situation, the ink will have to retain its essential properties both during storage, and during its circulation in the printer.

Finally, these inks have to dry rapidly, be capable of passing through the nozzle without blocking it, with great jet orientation stability while allowing easy cleaning of the printing head.

The ingredients which make up present inks, for the ink jet of the deviated continuous jet type, are organic or mineral products; these are coloring materials, such as coloring agents or pigments, resins or binders, in more or less volatile solvent(s) or in water, optionally with conductivity salt(s) as well as various additives.

The optional conductivity salt(s) provide(s) the ink with the required conductivity for electrostatic deviation. On this matter, reference may be made to document U.S. Pat. No. 4,465,800.

Additives comprise dispersants which allow dispersion of the pigments, surfactants which modify the wetting or penetrating power of the ink (U.S. Pat. No. 5,395,431), in particular those which modify or regulate the static or dynamic surface tension, such as Fluorad® FC 430 from 3M®, agents which inhibit corrosion induced by the salts which provide the aforementioned conductivity (see documents EP-A-0 510 752, U.S. Pat. No. 5,102,458), or further additives which protect the ink against proliferations of bacteria and of other micro-organisms: these are biocides, bactericides, fungicides and other agents, particularly useful in inks containing water, pH regulating buffers (see EP-A-0 735 120), anti-foam agents.

The coloring materials are called «coloring agents or pigments», depending on whether they are respectively soluble or insoluble in the solvent used.

The pigments, insoluble by nature, are therefore dispersed and may be either opaque or not. They provide the ink with its color, its opacity, or with particular optical properties, such as fluorescence (cf. patents or patent applications U.S. Pat. Nos. 4,153,593, 4,756,758, 4,880,465, EP-A-0 289 141, U.S. Pat. No. 5,395,432, GB-A-2,298,713). In certain cases, the coloring agents also themselves provide sufficient conductivity to the ink so that there is no need of adding a conductivity salt. The coloring agents known under the designation C. I. Solvent Black 27, 29, 35 and 45 are in this case.

The binder(s) or resin(s) is(are) generally mostly solid and polymeric compound(s) and their selection is dictated by their solubility in the selected solvents and by their compatibility with the coloring agents and the other additives, but also and especially depending on the properties which they provide to the ink film, once it is dry (see patent or patent applications U.S. Pat. No. 4,834,799, GB-A-2,286, 402, U.S. Pat. Nos. 5,594,044, 5,316,575, WO-A-96/23844, WO-A-95/29287).

Their primary function is to provide the ink with adherence on the maximum of supports or on specific supports, for example non-porous supports. They also give the possibility of giving the ink the adequate viscosity for forming drops from the jet and they provide the ink, or rather the obtained marking, with the essential of its properties of resistance to physical and/or chemical aggressions, in particular resistance to friction, to detachment by an adhesive tape («Scotch»®), or the resistance to other usual solvents such as ethyl alcohol.

The solvent of these inks most frequently consists of a mixture comprising a majority amount of volatile and not very viscous solvents on the one hand in order to allow very rapid drying of the markings and to adjust the viscosity to the desired value, for example from 2 to 10 mPa·s and, more viscous and less volatile solvents with slower drying, in a lesser amount, in order to avoid drying of the ink in the nozzle on the other hand during the stopping phases of the printing device (cf. patents or patent applications U.S. Pat. No. 4,155,767, WO-A-9214 794, WO-A-9214 795 and U.S. Pat. No. 4,260,531).

The most often used volatile solvents are alcohols, ketones or esters of low molecular weight, as this is indicated in patents U.S. Pat. Nos. 4,567,213, and 5,637,139. From among these solvents, mention may essentially be made of methanol, ethanol, 1- and 2-propanol, acetone, methyl ethyl ketone («MEK»), methyl-isobutyl ketone, ethyl acetate, and tetrahydrofurane.

The less volatile solvents notably having a function for retarding the drying are most often ketones, such as cyclohexanone, glycol ethers, mentioned in documents U.S. Pat. Nos. 4,024,096 and 4,567,213, ethers and acetals, such as furane or dioxane, mentioned in document U.S. Pat. No. 4,155,767, dimethyl formamide or dimethylsulfoxide (U.S. Pat. No. 4,155,895), lactones (EP-A-0 034 881), N-methyl pyrrolidone (EP-A-0 735 120), glycols (WO-A-96 23844), and even aliphatic hydrocarbons (U.S. Pat. No. 4,166,044) or further water, alone or combined with other solvents, mentioned above, on this subject, reference may be made to documents U.S. Pat. No. 4,153,593, GB-A-2,277,094 and FR-A-2 460 982.

Generally, the main or majority solvents of the inks for projection by a deviated continuous jet should meet a certain number of criteria, in particular:
  their volatility should be sufficient so that the ink dries rapidly on the support to be marked and not too rapid, in order not to evaporate too quickly in the printer, in particular during the stopping phases;
  their solvent power, towards binders of the ink, the coloring agents or pigment dispersions and towards the supports to be printed, should allow good adherence to be imparted to the dry ink;
  their effects on the health of persons, i.e. their toxicity, noxiousness, irritating nature and flammability, should be reduced;
  they should allow an ink optionally intended to be ingested to be maintained sterile;
  finally, they should have the capability of maintaining the ionic species dissolved and dissociated such as the salts which give the ink its electric conductivity.

Moreover, it is known that the traceability of products such as food, pharmaceutical or medical products, requires that diverse, specific and variable information should be printed on these products and/or the packaging of these products.

The particular case of products for which the origin and traceability of the production should be guaranteed, poses a problem which is particularly difficult to solve. Indeed, the markings then have to be permanent and in particular should resist any kinds of liquids so as to not be erasable.

In particular, the use-by date should not be able to be erased, for example by spraying with a solvent, so as to not be modified by unscrupulous actors for fraudulent purposes.

The technology of the deviated continuous ink jet is with the marking by a $CO_2$ laser, the most suitable technique for marking at a high rate, notably on curved surfaces, with variable information.

For such applications, the ink for printing with a deviated continuous jet and the deposited marking should meet particular requirements which are notably the following:
  the ink should dry very rapidly when the production rates are high;
  the marking should resist handling by the user, for example the marking should resist handling by the consumer during the whole period for consuming the contents of the packaging, such as a bottle;
  the marking should resist friction;
  the marking should be adherent; and especially and above all any marking should not be able to be erased, by spraying with a solvent. In other words, the obtained marking should be permanent, i.e. it should remain legible even after an erasement attempt by dissolution with a solvent, or more simply it should resist erasement by dissolution with a solvent.

Therefore there exists a need for an ink composition for printing by the continuous deflected, deviated ink jet technique which gives markings notably having resistance to erasement by dissolution with an enhanced solvent, as compared with known ink compositions, in particular on substrates, such as packagings, in organic polymers, notably in plastic materials and in particular on substrates in polyolefins, for example in polyethylenes or polypropylenes.

In particular, there exists a need for such an ink composition for printing with the technique of the deviated continuous jet which gives markings which resist to erasement by dissolution with a solvent already in a short time after projecting the ink, in the short term after printing.

The goal of the invention is to provide an ink composition in particular suitable for printing with a deviated continuous jet, which meets inter alia the whole of the needs, requirements and criteria indicated above, and which does not have the drawbacks, limitations, defects and disadvantages of the ink compositions of the prior art, and which overcomes the problems of the ink compositions of the prior art.

SUMMARY OF THE INVENTION

This goal and further other ones are achieved, according to the invention, by an ink composition for printing by the continuous deviated, deflected, ink jet technique, liquid at room temperature, comprising:
  a) a solvent comprising, preferably consisting of, one or several organic solvent compound(s), and optionally water;
  b) a binder, comprising at least one binding resin;
  c) at least one plasticizer of said binding resin;
  d) at least one dye which belongs to the family of anthraquinone dyes;

e) optionally, at least one or several other dye(s) and/or pigment(s) which do not belong to the family of anthraquinone dyes.

By «room temperature» is generally meant a temperature from 5° C. to 30° C., preferably from 10° C. to 25° C., still preferably from 15° C. to 24° C., better from 20° C. to 23° C. It is quite understood that the ink is liquid at atmospheric pressure.

The ink composition according to the invention is defined by a set of specific characteristics which has never been described, nor suggested in the prior art.

According to a fundamental characteristic, the ink composition according to the invention comprises a combination of specific compounds which has never been described nor suggested in the prior art.

In particular, the ink composition according to the invention comprises the combination of a binding resin, of a plasticizer of this binding resin and of a highly specific dye belonging to the family of anthraquinone dyes which has never been described nor suggested in the prior art.

The ink composition according to the invention inter alia meets the needs, criteria and requirements mentioned above and provides a solution to the problems of the ink compositions of the prior art.

According to the invention, it was notably seen surprisingly that the specific combination in the ink according to the invention of a binding resin, of a plasticizer of this binding resin and of a highly specific coloring agent belonging to the anthraquinone family gave the possibility of obtaining ink compositions in which the dye from the family of anthraquinone dyes, and only this dye, migrates to the support, substrate to be marked, in particular to supports made of organic polymers, notably made of plastic materials (thermoplastic polymers), and preferably made of polyolefins, for example made of polyethylenes or made of polypropylenes.

This migration is rapid. Indeed, it occurs generally within a few hours, for example less than 24 hours, so that in a short time after the projection of the ink composition according to the invention on a support, substrate, of the markings in particular resistant to erasure by dissolution with a solvent, are obtained.

These markings remain therefore perfectly legible, even after dissolution of the ink of the marking by a solvent unlike markings which do not comprise the specific combination of the components of the ink according to the invention (see Examples).

In other words, the markings obtained with the ink composition according to the invention are unerasable under the action of solvents, notably organic solvents.

The resistance of the markings obtained with the ink composition according to the invention, in particular resistance to erasement by dissolution with a solvent is particularly high on supports made of organic polymers, notably on plastic materials (thermoplastic polymers), and in particular on polyolefins, for example polyethylenes or polypropylenes.

It was also seen in a surprising way that, in the ink composition according to the invention comprising a dye of the anthraquinone type tending to migrate in the support, this dye of the anthraquinone type did not indefinitely migrate over time, and consequently, resistance, in particular to erasement by dissolution with a solvent, is imparted to the marking over a long time, while this resistance is acquired in a short period after projecting the ink, after printing.

It was not inferred obviously from known ink compositions that the combination of a binding resin, of a plasticizer of this binding resin and of a highly specific dye belonging to the family of anthraquinone dyes, might provide the markings with such a resistance, such unerasability.

Thus, the patent application US-A1-2008/0066239 (U.S. Pat. No. 7,520,926) describes ink compositions for inkjet printing which comprise one or several organic solvents, one or several binding resins and a dye of the quinone type, i.e. naphthaquinone or anthraquinone insoluble in water.

This document, and in particular the formulations of the examples of this document, neither describe nor suggest an ink composition comprising the combination of a binding resin, of a plasticizer of this binding resin and of a highly specific dye belonging to the family of anthraquinone dyes. Further there is no indication in this document on the unexpected migration properties of the dyes of the family of anthraquinone dyes, notably to supports made of organic polymers, in particular to supports made of plastic materials (thermoplastic polymers), which are observed in the ink compositions according to the invention.

Finally, there is neither mention nor suggestion in this document that an ink composition comprising the combination of a binding resin, of a plasticizer of this binding resin and of a highly specific dye belonging to the family of anthraquinone dyes may lead to highly resistant markings, in particular markings resistancy to erasement by dissolution with a solvent.

Indeed, according to a fundamental aspect of the invention, the inks according to the invention give markings which remain legible even after dissolution with a solvent, this dissolution may surprisingly occur a short time after the printing, for example only a few hours after printing.

Advantageously, the binding resin may be selected from (meth)acrylic, vinylic, ketonic, hydroxyaromatic, cellulosic, styrenic, epoxy, polyurethane, styrene-acrylate, alkoxysilane, ester resins, and combinations of two or more of the latter.

Preferably, the binding resin is selected from cellulosic, polyurethane, vinylic resins and the combinations of two or more of the latter.

The cellulosic resins may be cellulose acetobutyrate resins. An example of a cellulose acetobutyrate resin is the resin available from Eastman® under the name of CAB553.04.

By polyurethane resins, are meant resins from the polycondensation of polyalcohols and of polyisocyanates. An example of a polyurethane binding resin is the resin available from Ernisunion® under the name of Surkopak® 5311.

An example of a vinylic binding resin is the resin available from Wacker® under the name of Vinnol E1545M®.

Advantageously, the binder represents from 0.1 to 50% by weight, preferably from 1% to 45% by weight, still preferably from 5% to 30% by weight, better from 10% to 20% by weight, of the total weight of the ink composition according to the invention.

More preferably, the binder may consist of a cellulosic resin such as an acetobutyrate resin, representing from 0.1 to 15% by weight, preferably from 1 to 10% by weight of the total weight of the ink composition according to the invention.

The plasticizer may be selected from all the plasticizers known to the man skilled in the art. The plasticizer is selected according to the binder used comprising one or several binding resin(s).

Mention may be made, as a plasticizer, for example, of thermoplastic polyurethanes, phthalates, adipates, esters such as citrates like trialkyl citrates, for example tributyl citrate, alkyl phosphates, glycerol, lactic acid, oleic acid, polypropylene glycol, triglycerides of fatty acids, levulinic acid; carbamates or carbamic resins; and mixtures thereof.

By thermoplastic polyurethane, are meant polyurethanes from the polycondensation of polyalcohols and of polyisocyanates.

It should be noted that the thermoplastic polyurethane plasticizers are of course different from the polyurethane binding resins and should not be confused with the latter.

Thus, the glass transition temperature Tg is itself generally greater than room temperature (RT) for binding resins, while it is generally less than room temperature for plasticizers.

The molecular mass is generally high for binding resins (for example of more than 10,000 Da), while the molecular mass is generally lower for plasticizers (for example less than 10,000 Da).

An example of such a polyurethane plasticizer is the polyurethane resin available under the name of Unithane® 672S65 from Ernisunion®.

An example of such a plasticizing carbamic resin is the carbamic resin available under the name of Resamine® HF480 from Allnex®.

Preferably, the plasticizer is selected from thermoplastic polyurethanes, esters, carbamates, and mixtures thereof.

The plasticizer(s) is(are) generally present in an amount of at least 0.05% by weight, preferably from 0.1% to 20% by weight, of the total weight of the ink composition. The dye belonging to the family of anthraquinones may be selected from C. I. Solvent Blue 36, C. I. Solvent Blue 45, C. I. Solvent Blue 104, and mixtures thereof.

Advantageously, the dye belonging to the family of anthraquinone dyes is C. I. Solvent Blue 104.

Advantageously, the ink composition according to the invention comprises from 0.01% to 5% by weight, preferably from 0.01% to 2% by weight of said at least one dye belonging to the family of anthraquinones.

The ink composition according to the invention comprises a very small amount of water, generally less than 10% by weight, preferably less than 5%, still preferably less than 1% by weight, based on the total weight of the ink composition.

The ink composition according to the invention may even be considered as being essentially free of water (0% of water).

In fact, the water present is only the provided water found as an impurity in the various components of the ink. The greater the purity level of the selected components the lower will be the water content.

The low content or absence of water in the ink composition according to the invention promotes formation of the ink film when the binders and other coloring agents of the composition are insolubles in water, thereby improving the resistance and adherence properties of the ink.

In the composition according to the invention, the solvent generally represents at least 20% by weight of the total weight of the ink composition, preferably the solvent represents from 30% to 90% by weight, still preferably from 60% to 80% by weight, of the total weight of the ink composition.

The solvent comprises, preferably consists of, one or several organic solvent compounds and optionally of water provided that the amount of water observes the conditions indicated above.

Advantageously, said organic solvent compound(s) comprise(s) a majority proportion by weight, based on the total weight of the solvent (50% by weight of the total weight of the solvent or more, or even up to 100% by weight of the total weight of the solvent), of one or several volatile organic solvent compound(s) and a minority proportion by weight, based on the total weight of the solvent, of one or several non-volatile organic solvent compound(s).

Preferably, the solvent consists of one or several volatile organic solvent compound(s).

By "volatile organic solvent compound", is generally meant that this compound has an evaporation rate of more than 0.5 on the scale where butyl acetate has an evaporation rate equal to 1.

Said organic solvent compound(s) being part of the solvent is(are) selected, for example, from alcohols, in particular, low molecular weight alcohols, for example, aliphatic alcohols such as ethanol; ketones preferably of low molecular weight; ethers of alkylene glycols; esters of alkylene glycols and esters of alkylene glycol ethers, such as acetates; dimethyl formamide; N-methyl pyrrolidone; acetals; esters; linear or cyclic ethers; cyclic or linear aliphatic hydrocarbons; aromatic hydrocarbons; and carbonates such as propylene carbonate, ethylene carbonate and dimethyl- and diethyl-carbonates; and mixtures thereof.

Preferably, this(these) solvent compound(s) has(ve) the property of dissolving the other ingredients of the ink, notably the binder, the coloring materials, the additives, etc.

The alcohols will preferably be selected from linear or branched aliphatic alcohols with 1 to 8 carbon atoms, such as methanol, ethanol, propanol-1, propanol-2, n-butanol, butanol-2, tert-butanol, etc.

The ketones will preferably be selected from ketones with 3 to 10 carbon atoms, such as acetone, butanone (methyl-ethyl-ketone), pentanone-2 (methyl-propyl-ketone), methyl-3 butanone-2 (methyl-isopropyl ketone) and methyl-4 pentanone-2 (methyl-isobutyl-ketone).

The ethers of alkylene glycols are preferably selected from mono-alkyl ($C_1$-$C_6$ alkyl group) or dialkyl ($C_1$-$C_6$ alkyl groups) ethers of alkylene glycol comprising 1 to 10 carbon atoms in the alkylene chain, preferably these are ethers of ethylene or propylene glycol, such as methoxy-propanol.

The esters of alkylene glycols and the esters of alkylene glycol ethers are preferably selected from the esters of the latter with saturated aliphatic carboxylic acids with 1 to 6 carbon atoms, such as formic acid, acetic acid, propionic acid, butyric acid, valeric acid and caproic acid.

For example mention may be made of methoxypropyl acetate, butyldiglycol acetate, etc.

The esters are preferably selected from esters with low molecular weight such as formates, acetates, propionates or butyrates of alcohols with 1 to 10 carbon atoms.

Acetals are preferably selected from acetals with low molecular weight such as ethylal and methylal.

The ethers are preferably selected from ethers with low molecular weight like dioxolane or tetrahydrofurane.

The man skilled in the art may easily identify from among these solvent compounds those which are volatile and those which are non-volatile.

A preferred solvent according to the invention comprises a majority amount by weight based on the total weight of the solvent, preferably consists of one or several solvent compound(s) selected from ketones with 3 to 10 carbon atoms, such as acetone, butanone (methyl-ethyl-ketone or MEK), pentanone-2 (methyl-propyl-ketone), methyl-3 butanone-2 (methyl-isopropylketone), and methyl-4 pentanone-2 (methyl-isobutyl-ketone or MIK).

A more preferred solvent comprises a majority amount by weight based on the total weight of the MEK solvent, preferably consists of MEK.

This preferred solvent may further comprise one or several other solvent compound(s) other than the ketone(s) in a total minority amount by weight, based on the total weight of the solvent, for example in an amount from 0.1% to 20% by weight, preferably from 5% to 15% by weight, based on the total weight of the solvent, in order to optimise the properties of the inks. These minority solvents may be selected from esters, ethers of ethyleneglycol or propyleneglycol, and acetals.

In addition to the dye belonging to the family of anthraquinone dyes, which is always present, the ink composition according to the invention may optionally comprise one or several other dyes and/or pigments which do not belong to the family of anthraquinone dyes.

This or these other dye(s) and/or pigment(s) may be selected from among all the dyes or pigments suitable for the sought use, known to the man skilled in the art, certain of these pigments or dyes have already been mentioned above.

The other dyes and the other pigments will generally be selected from among the dyes and pigments known under the name of «C. I. Solvent Dyes» and «C. I. Pigments».

As an example, of the most common pigments and dyes, mention may be made of C.I. Solvent Black 3, C.I. Solvent Black 7, C. I. Solvent Black 29, C. I. Solvent Black 27, C. I. Solvent Black 28, C. I. Solvent Black 35, C. I. Solvent Blue 45, C. I. Solvent Blue 70, C. I. Solvent Red 124, dispersions of Pigment Blue 60, of Pigment Black 7, of Pigment White 6, or of Pigment Blue 15; or further fluorescent dyes; and optical brighteners.

The pigments also include lacquers.

Advantageously, the other dye(s) is(are) selected from among organic dyes soluble in ketones.

Advantageously, the other pigment(s) may be selected from among carbon blacks, titanium oxides, and mixtures thereof.

An other preferred dye is C.I. Solvent Black 3.

According to a particularly preferred embodiment of the ink composition according to the invention, the latter comprises a dye belonging to the family of anthraquinone dyes which is of a first color for example a blue color, and an other dye and/or pigment not belonging to the family of anthraquinone dyes which is of a second color, different from the first color, for example a black color.

Thus, the ink according to the invention may comprise as a dye belonging to the family of anthraquinone dyes, the dye Solvent Blue 104 and as other dye, the dye Solvent Black 3.

When this ink composition is used for marking a substrate, it gives markings which are generally of the second color. If these markings are sprayed with a solvent in order to erase them and to replace them with others, for example for fraudulent purposes, they will not be erased like all the markings produced with the ink compositions according to the invention, they will remain always legible and will keep the first color, i.e. the color of the dye belonging to the family of anthraquinone dyes. For example, the marking initially with a black color will be of a blue color after spraying with a solvent.

Thus, not only the initial marking remains always legible and is not erased but the change in color of the marking reports the fraudulent attempt to erase it.

When the ink composition according to the invention, comprises a coloring agent belonging to the family of anthraquinone dyes which is of a first color for example a blue color, and an other dye and/or pigment not belonging to the family of anthraquinone dyes which is of a second color, different from the first color, for example of black color, the binder preferably consists of a cellulosic resin, such as a cellulose acetobutyrate resin which gives the best results in terms of legibility of the markings after dissolution and transfer of the ink into the substrate.

The total amount of dye(s) and/or pigment(s) including the dye belonging to the family of anthraquinone dyes, is generally from 0.05% to 25% by weight, preferably from 1% to 20% by weight, still preferably from 3% to 10% by weight, of the total weight of the ink composition.

The ink composition according to the invention may, additionally, optionally comprise at least one conductivity salt.

Indeed, as the ink composition according to the invention is applicable by a continuous deviated, deflected ink jet, it should have sufficient electric conductivity generally greater than or equal to 300 µS/cm at 20° C., preferably greater than or equal to 500 µS/cm at 20° C.

The conductivity of the ink composition according to the invention may for example be from 300 to 5,000 µS/cm at 20° C., notably from 500 to 2,000 µS/cm at 20° C.

The products providing the ink with the conductivity required for projection by a continuous ink jet are ionizable compounds, such as salts. It is possible that dyes, pigments, or other ingredients of the ink are themselves salts and gives sufficient conductivity to the ink so that there is no need to add thereto any conductivity salts strictly speaking: this is notably the case of the compounds known under the name of «C. I. Solvent Black 27, 29, 35 and 45», already mentioned.

However, it will often be necessary to include in the ink composition, a conductivity salt different from the dyes, pigments and other ingredients.

Thus, the ink composition according to the invention may further comprise at least one conductivity salt.

By «conductivity salt», is meant a salt which provides electric conductivity to the ink composition.

This (these) conductivity salt(s) is (are) generally selected from salts of alkaline metals, salts of earth-alkaline metals, simple ammonium salts, and quaternary ammonium salts. These salts may be in the form of nitrates, thiocyanates, formates, acetates, sulphates, propionates, hexafluorophosphates, hexafluoroantimonates etc.

When the markings obtained with the ink composition have to be resistant to water, this or these conductivity salt(s) will be selected from among those which are insoluble in water (i.e. generally, for which the solubility in water is less than 0.5% by weight), like quaternary ammoniums with a fatty chain and hexafluorophosphates or hexafluoroantimonates.

This(these) conductivity salt(s) will therefore be present, if necessary, in the ink composition so as to impart to the ink the above conductivity, in an amount of generally at least 0.05% by weight, preferably from 0.1% to 20% by weight, still preferably from 0.1% to 10% by weight, and better from 0.1% to 5% by weight, of the total weight of the ink composition.

The composition according to the invention may further comprise one or several additive(s) especially selected from compounds which improve the solubility of some of these components, the printing quality, the adherence, or further the control of the wetting of the ink on various supports.

The additive(s) may for example be selected from anti-foam agents; chemical stabilizers; UV stabilizers; surfactants, such as Fluorad® FC 430 or Byk® 333; the agents inhibiting corrosion by salts especially by the conductivity salts; bactericides, fungicides and biocides; and pH regulating buffers, etc.

The additive(s) is(are) used at very small doses, generally less than or equal to 5% and sometimes as low as 0.01% by weight, depending on whether these are anti-foam agents, stabilizers or surfactants.

The invention further relates to a method for marking a substrate, support, or object by projecting, spraying on a surface of this substrate, support, or object of an ink composition by the deviated, deflected continuous ink jet technique, in which the projected, sprayed ink composition is the ink composition according to the invention as described in the foregoing.

Generally, before the projection of the ink composition, the surface of the substrate, support, or object is not subject to any surface treatment other than simple cleaning. In other words, the surface is not subject to any activation treatment.

The invention also relates to a substrate, support, or object provided with a marking obtained by drying, and/or absorption in the substrate, support or object, of the ink composition according to the invention.

This substrate may be porous or non-porous.

This substrate may be made of a metal, for example made of aluminum, of stainless steel; of glass; of ceramic; of a material containing cellulose such as paper, optionally coated, or glossy paper, cardboard or wood; of an organic polymer, notably of a thermoplastic polymer, preferably selected from PVCs, PETs, polyolefins, such as polyethylenes (PE), and polypropylenes (PP); of poly(methyl methacrylate) PMMA also called «Plexiglas»; of fabric; or of any other non-porous or porous substance, or of a composite of several of the previous materials.

A preferred substrate is a substrate made of polyolefin, for example made of polyethylene.

The substrate, or rather the surface of the substrate, provided with the marking, may have any shape, even a complex shape, this may notably be a curved surface for example the surface of a packaging or container, such as a bottle, or the surface of a stopper.

Markings, prints of excellent quality and resistance are obtained on all the substrates, even very little porous substrates, in particular on polyolefin substrates, for example made of polyethylene or polypropylene, even having complex shapes such as packagings or containers such as bottles; or stoppers; especially made of a polyolefin, for example made of a polyethylene or of a polypropylene.

The invention further relates to the use of the combination of a binder comprising at least one binding resin, at least one plasticizer of said binding resin, and of at least one dye belonging to the family of anthraquinone dyes, in an ink composition for printing by the deviated continuous ink jet technique, liquid at room temperature, for causing migration of said at least one dye belonging to the family of anthraquinone dyes to a support on a surface of which the ink composition is applied.

The invention also relates to the use of the combination of a binder comprising at least one binding resin, at least one plasticizer of said binding resin, and at least one dye belonging to the family of anthraquinone dyes, in an ink composition for printing by the deviated continuous ink jet technique, liquid at room temperature, in order to prepare a marking which resists erasure by dissolution with a solvent, such as an organic solvent.

DETAILED DESCRIPTION OF PARTICULAR EMBODIMENTS

The invention will be better understood upon reading the following description of embodiments of the invention, given as illustrative and non-limiting examples.

EXAMPLES

The following ink compositions were prepared by mixing the products mentioned in the Table I below, in the indicated proportions.

The ink compositions prepared are ink compositions according to the invention (Compositions of Examples No. 1, No. 2, and No. 3), and a comparative ink composition not compliant with the invention (composition of the Comparative Example).

The viscosities and the conductivities of the inks obtained are also given in Table I below.

TABLE I

| Constituents (percentage by weight) | Comparative Example | Example No. 1 | Example No. 2 | Example No. 3 |
|---|---|---|---|---|
| Methyl-ethyl ketone | 89.1 | 78.95 | 79.45 | 79.45 |
| Cellulosic resin (cellulose acetobutyrate CAB553.04) | 5.4 | 3.23 | 4.5 | 4.5 |
| Polyurethane resin (Unithane ® 672S65) | | 12.93 | | |
| Tributyl citrate | | | 11.5 | |
| Carbamic resin (Resamine ® HF480) | | | | 11.5 |
| Solvent Black 3 | 3.9 | 3.45 | 3.2 | 3.2 |
| Solvent blue 104 | 0.5 | 0.48 | 0.45 | 0.45 |
| Tetrabutyl-ammonium hexafluorophosphate | 1.1 | 0.96 | 0.9 | 0.9 |
| Viscosity (mPa · s) | 4.8 | 4.6 | 4.3 | 4.6 |
| Conductivity (µS/cm) | 844 | 840 | 802 | 770 |

CAB553.04 manufactured by Eastman ®.
Unithane ® 672S65 manufactured by Ernisunion ®.
Resamine ® HF480 manufactured by Allnex ®.

The thereby prepared inks were deposited by means of Markem-Imaje® 9040 printers, which use the deviated continuous ink jet printing technique, on flasks made of polyethylene. Markings were thereby obtained on these flasks.

After 4 hours and 24 hours of drying, the markings on these flasks made of polyethylene were sprayed with methylethylketone for completely dissolving the marking.

After dissolution of the markings, the residual legibility is observed.

The Examples 1, 2 and 3 according to the invention show legibility and transfer of ink into the support much greater than in the Comparative Example which does not contain any plasticizer.

The invention claimed is:

1. An ink composition for printing, by a continuous deflected ink jet technique, the ink composition comprising:
   a) a solvent including one or several organic solvent compounds, the solvent being at least 20% by weight of a total weight of the ink composition;
   b) a binder consisting of a cellulose resin, the binder being in an amount of 0.1 to 50% by weight of the total weight of the ink composition;

c) at least one plasticizer of said binder, the at least one plasticizer being a carbamic resin and in an amount of at least 0.05% by weight of the total weight of the ink composition; and d) at least one dye belonging to a family of anthraquinone dyes, wherein said at least one dye belonging to the family of anthraquinone dyes is of a first color, wherein said ink composition further comprises another dye and/or pigment not belonging to the family of anthraquinone dyes, the another dye and/or pigment being of a second color different from the first color, wherein the ink composition is liquid at room temperature, and wherein a total amount of dye(s) and/or pigment(s) including the at least one dye belonging to the family of anthraquinone dyes and the another dye and/or pigment not belonging to the family of anthraquinone dyes is in an amount of 0.05% to 25% by weight of the total weight of the ink composition.

2. The ink composition according to claim 1, wherein the at least one dye belonging to the family of anthraquinone dyes, is selected from the group consisting of C. I. Solvent Blue 36, C. I. Solvent Blue 45, C. I. Solvent Blue 104, and mixtures thereof.

3. The ink composition according to claim 1, comprising from 0.01% to 5% by weight of said at least one dye belonging to the family of anthraquinone dyes.

4. The ink composition according to claim 1, wherein the ink composition comprises less than 10% by weight of water, based on the total weight of the ink composition.

5. The ink composition according to claim 1, wherein said one or several organic solvent compounds comprises a majority proportion by weight, based on the total weight of the solvent, of one or several volatile organic solvent compounds, and a minority proportion by weight, based on the total weight of the solvent, of one or several non-volatile organic solvent compounds.

6. The ink composition according to claim 1, wherein the solvent comprises a majority amount by weight, based on the total weight of the solvent, of one or several solvent compounds selected from ketones with 3 to 10 carbon atoms.

7. The ink composition according to claim 6, further comprising
one or several other solvent compounds other than the ketones in a minority total amount by weight, based on the total weight of the solvent.

8. The ink composition according to claim 6, wherein the solvent comprises a majority amount by weight, based on the total weight of the solvent, of one or several solvent compounds selected from acetone, butanone (methyl-ethyl-ketone or MEK), pentanone-2 (methyl-propyl-ketone), methyl-3 butanone-2 (methyl-isopropylketone) and methyl-4 pentanone-2 (methyl-isobutyl-ketone or MIK).

9. The ink composition according to claim 1, wherein the ink composition has an electric conductivity greater than or equal to 300 µS/cm at 20° C.

10. The ink composition according to claim 1, further comprising
at least one conductivity salt.

11. The ink composition according to claim 10, wherein the at least one conductivity salt is present in an amount of at least 0.05% by weight, of the total weight of the ink composition.

12. The ink composition according to claim 10, wherein said at least one conductivity salt is selected from conductivity salts insoluble in water.

13. The ink composition according to claim 1, further comprising
one or several additives selected from anti-foam agents; chemical stabilizers; UV stabilizers; surfactants; agents inhibiting corrosion by salts; bactericides, fungicides and biocides; and pH regulating buffers.

14. The ink composition of claim 1, wherein the solvent further comprises water.

15. The ink composition according to claim 1, wherein said another dye and/or pigment is selected from dyes and pigments of "C. I. Solvent Dyes", "C. I. Pigments", fluorescent dyes, and optical brighteners.

16. The ink composition according to claim 15, wherein said dyes and pigments of "C. I. Solvent Dyes" and "C. I. Pigments" include at least one selected from C. I. Solvent Black 3, C. I. Solvent Black 29, C. I. Solvent Black 27, C. I. Solvent Black 7, C. I. Solvent Black 28, C. I. Solvent Black 35, C. I. Solvent Blue 45, C. I. Solvent Blue 70, C. I. Solvent Red 124, the dispersions of Pigment Blue 60, of Pigment Blue 15, of Pigment Black 7, and of Pigment White 6.

17. The ink composition according to claim 1,
wherein said at least one dye belonging to the family of anthraquinone dyes is of blue color, and
wherein said another dye and/or pigment not belonging to the family of anthraquinone dyes is of black color.

18. The ink composition according to claim 17,
wherein said at least one dye belonging to the family of anthraquinone dyes is Solvent Blue 104 dye, and
wherein said another dye and/or pigment not belonging to the family of anthraquinone dyes is Solvent Black 3 dye.

19. The ink composition according to claim 1, wherein the cellulose resin is a cellulose acetobutyrate resin.

20. The ink composition according to claim 1, wherein
said at least one dye belonging to the family of anthraquinone dyes is of blue color,
said another dye and/or pigment not belonging to the family of anthraquinone dyes is of black color, and
the cellulose resin is a cellulose acetobutyrate resin.

21. A method for marking a substrate, support or object comprising:
projecting onto a surface of said substrate, support, or object an ink composition by a deflected continuous ink jet technique,
wherein the projected ink composition is the ink composition including
a) a solvent including one or several organic solvent compounds, the solvent being at least 20% by weight of a total weight of the ink composition;
b) a binder consisting of a cellulose resin, the binder being in an amount of 0.1 to 50% by weight of the total weight of the ink composition;
c) at least one plasticizer of said binder, the at least one plasticizer being a carbamic resin and in an amount of at least 0.05% by weight of the total weight of the ink composition; and
d) at least one dye belonging to a family of anthraquinone dyes, and
wherein said at least one dye belonging to the family of anthraquinone dyes is of a first color,
said ink composition further comprises another dye and/or pigment not belonging to the family of anthraquinone dyes, the another dye and/or pigment being of a second color different from the first color, wherein the ink composition is liquid at room temperature; and wherein a total amount of dye(s) and/or pigment(s) including the at least one dye belonging to the family of anthraquinone dyes and the another dye and/or pigment not belonging to the family of anthraquinone dyes is in an amount of 0.05% to 25% by weight of the total weight of the ink composition.

22. The method according to claim 21, wherein, before projecting the ink composition, the surface of the substrate, support, or object is not subject to any activation treatment.

23. A marked substrate, marked support, or marked object comprising:
a marking obtained by drying, and/or absorption, in a substrate, support, or object, of an ink composition, wherein the ink composition comprises
a) a solvent including one or several organic solvent compounds, the solvent being at least 20% by weight of a total weight of the ink composition;
b) a binder consisting of a cellulose resin, the binder being in an amount of 0.1 to 50% by weight of the total weight of the ink composition;
c) at least one plasticizer of said binder, the at least one plasticizer being a carbamic resin and in an amount of at least 0.05% by weight of the total weight of the ink composition; and
d) at least one dye which belongs to a family of anthraquinone dyes,
wherein said at least one dye belonging to the family of anthraquinone dyes is of a first color,
wherein the ink composition further comprises another dye and/or pigment not belonging to the family of anthraquinone dyes, the another dye and/or pigment being of a second color different from the first color,
wherein the ink composition is liquid at room temperature, and
wherein a total amount of dye(s) and/or pigment(s) including the at least one dye belonging to the family of anthraquinone dyes and the another dye and/or pigment not belonging to the family of anthraquinone dyes is in an amount of 0.05% to 25% by weight of the total weight of the ink composition.

24. The marked substrate, marked support or marked object, according to claim 23, wherein the substrate, support or object is made of a metal, glass, ceramic, a material containing cellulose, an organic polymer, poly(methyl methacrylate), fabric, or a composite of several of these materials.

25. The marked substrate, marked support or marked object, according to claim 24, wherein the metal is aluminum or stainless steel,
wherein the material containing cellulose is uncoated paper, coated paper, glossy paper, cardboard or wood, and
wherein the organic polymer is a thermoplastic polymer.

26. The marked substrate, marked support or marked object, according to claim 25, wherein the thermoplastic polymer is selected from the group consisting of PVCs, PETs, and polyolefins.

27. The marked substrate, marked support or marked object according to claim 24, wherein the substrate, support or object is a packaging or a container or a stopper.

28. The marked substrate, marked support or marked object according to claim 27, wherein the packaging, the container, and the stopper are each made of a polyolefin.

29. A method of printing, comprising:
combining (a) a solvent including one or several organic solvent compounds, (b) a binder consisting of a cellulose resin, (c) at least one plasticizer of said binder, (d) at least one dye belonging to a family of anthraquinone dyes and another dye and/or pigment not belonging to the family of anthraquinone dyes, to form an ink composition, the ink composition being liquid at room temperature; printing the ink composition by a deflected continuous ink jet technique on a substrate, support or object;
migrating said at least one dye belonging to the family of anthraquinone dyes into the substrate, support or object on a surface of which the ink composition is applied, wherein the at least one dye belonging to the family of anthraquinone dyes is of a first color, and the another dye and/or pigment is of a second color different from the first color,
wherein the solvent is in an amount of at least 20% by weight of a total weight of the ink composition,
wherein the binder is in an amount of 0.1 to 50% by weight of a total weight of the ink composition,
wherein the at least one plasticizer is a carbamic resin and in an amount of at least 0.05% by weight of the total weight of the ink composition, and
wherein a total amount of dye(s) and/or pigment(s) including the at least one dye belonging to the family of anthraquinone dyes and the another dye and/or pigment not belonging to the family of anthraquinone dyes is in an amount of 0.05% to 25% by weight of the total weight of the ink composition.

30. A method of printing, comprising:
combining (a) a solvent including one or several organic solvent compounds, (b) a binder consisting of a cellulose resin, (c) at least one plasticizer of said binder, (c) (d) at least one dye belonging to a family of anthraquinone dyes and another dye and/or pigment not belonging to the family of anthraquinone dyes, to form an ink composition, the ink composition being liquid at room temperature; and
printing the ink composition by a deflected continuous ink jet technique on a substrate, support or object to form a marking,
wherein the marking is resistant to erasement by dissolution with a solvent, wherein the at least one dye belonging to the family of anthraquinone dyes is of a first color, and the another dye and/or pigment is of a second color different from the first color,
wherein the solvent is in an amount of at least 20% by weight of a total weight of the ink composition,
wherein the binder is in an amount of 0.1 to 50% by weight of a total weight of the ink composition,
wherein the at least one plasticizer is a carbamic resin and in an amount of at least 0.05% by weight of the total weight of the ink composition, and
wherein a total amount of dye(s) and/or pigment(s) including the at least one dye belonging to the family of anthraquinone dyes and the another dye and/or pigment not belonging to the family of anthraquinone dyes is in an amount of 0.05% to 25% by weight of the total weight of the ink composition.

31. The method of claim 30, wherein said solvent to which the marking is resistant to erasement by dissolution is an organic solvent.

* * * * *